United States Patent [19]
Franke et al.

[11] Patent Number: 5,890,083
[45] Date of Patent: Mar. 30, 1999

[54] APPARATUS FOR DETERMINING THE DISTANCE OF A VEHICLE FROM A ROADWAY SIDE MARKING

[75] Inventors: Uwe Franke, Uhingen; Stefan Hahn, Denkendorf, both of Germany

[73] Assignee: Daimler Benz AG, Germany

[21] Appl. No.: 612,288

[22] Filed: Mar. 7, 1996

[30] Foreign Application Priority Data

Mar. 7, 1995 [DE] Germany .................. 195 07 956.6

[51] Int. Cl.$^6$ .............................. G01B 11/14; G05D 1/02
[52] U.S. Cl. ............................. 701/45; 701/301; 348/118
[58] Field of Search .................... 364/424.055, 424.045, 364/424.033, 460, 461; 348/118, 119; 356/3.14; 701/45, 36, 28, 300, 301; 180/168, 169

[56] References Cited

U.S. PATENT DOCUMENTS

| | | | |
|---|---|---|---|
| 4,630,109 | 12/1986 | Barton | 358/103 |
| 4,905,151 | 2/1990 | Weiman et al. | 364/424.02 |
| 4,970,653 | 11/1990 | Kenue | 364/461 |
| 5,661,472 | 8/1997 | Koshizawa | 340/901 |

FOREIGN PATENT DOCUMENTS

| | | |
|---|---|---|
| 0 361 914 | 4/1990 | European Pat. Off. . |
| 0 586 857 | 3/1994 | European Pat. Off. . |
| 0 640 903 | 3/1995 | European Pat. Off. . |
| 44 10 064 | 9/1994 | Germany . |
| 51-55535 | 5/1976 | Japan . |
| 51-58228 | 5/1976 | Japan . |
| 2-216340 | 8/1990 | Japan . |
| 5-46242 | 2/1993 | Japan . |
| 6-147887 | 5/1994 | Japan . |
| 6-284332 | 10/1994 | Japan . |
| 7-47864 | 2/1995 | Japan . |

OTHER PUBLICATIONS

IT + TI *Informationstechnik und Technische Informatik*, vol. 36, No. 1, Feb. 1, 1994, pp. 16–24 by V. Graefe entitled "Echtzeit–Bildverarbeitung für ein Fahrer–Unterstützungssystem zum Einsatz auf Autobahnen".

*IEEE Transactions of Industrial Electronics*, vol. 39, No. 3, Jun. 1, 1992, pp. 181–188 by J. Manigel et al. entitled "Vehicle Control by Computer Vision".

*Primary Examiner*—Michael Zanelli
*Attorney, Agent, or Firm*—Evenson, McKeown, Edwards & Lenahan P.L.L.C.

[57] ABSTRACT

Apparatus is provided for determining the distance of a vehicle from a roadway side marking. An arrangement of light sensitive sensor elements is fitted to the vehicle for optically scanning a portion of the roadway located in front of the vehicle. An evaluation unit, connected downstream of the sensor element arrangement, is also provided. Only one or a few sensor element lines are used as the sensor element arrangement. Each line scans a narrow strip of the roadway which runs in front of the vehicle, not parallel to the vehicle longitudinal axis, and extends laterally as far as the roadway side marking. The evaluation unit reads each sensor element line sequentially and processes the received signals to determine the lateral distance of the vehicle from the roadway marking. The relatively small quantity of data which accumulates permits the processing of the data digitally in real time by a conventional microprocessor. The apparatus is used as sleep warning system or lane guard for motor vehicles.

12 Claims, 1 Drawing Sheet

APPARATUS FOR DETERMINING THE DISTANCE OF A VEHICLE FROM A ROADWAY SIDE MARKING

BACKGROUND AND SUMMARY OF THE INVENTION

The invention relates to an apparatus for determining the distance of a vehicle from at least one roadway side marking and, more particularly, to an apparatus for determining the distance of a vehicle from a roadway side marking having an arrangement, fitted to the vehicle, of light-sensitive sensor elements for optically scanning a portion of the roadway located in front of the vehicle. The sensor element arrangement includes at least two sensor element lines, each of which scans a strip of the roadway which runs in front of the vehicle and is not parallel to the vehicle longitudinal axis, and extends laterally as far as the roadway side marking. An evaluation unit, which is connected downstream of the sensor element arrangement, reads each sensor element line sequentially and further processes the received signals for determining the lateral distance of the vehicle from the roadway marking.

An apparatus for determining the vehicle distance from a roadway side marking may be used, in particular, as a so-called sleep warning system, that is to say as a system which emits an acoustic or haptic warning if the vehicle threatens to leave the roadway and, therefore, to travel over a roadway side marking due for example to a faulty steering reaction of a tired or distracted driver.

In European Patent documents, EP 0 586 857 A1 and EP 0 361 914 A2, as well as in U.S. Pat. No. 4,970,653, the sensor element arrangement, in each case, comprises a two-dimensional sensor element array of an image recording camera. The array is arranged in the front portion of the associated vehicle, pointing to the front, in order to optically scan a specific portion of the roadway area in front of the vehicle. The image information obtained from the camera is further processed in an analog manner, for example by nonlinear resistance networks, in order to generate a binary image pattern of the roadway markings. By means of known techniques, such as Hough transformation and Kalman filtering, the parameters which are relevant for determining the distance are extracted therefrom by a microprocessor.

The conventional use of image recording cameras having a two-dimensional sensor element array in the form of a CCD array analog requires further processing of the sensor data for use in a vehicle, since digital real-time data processing of the high data rates from such a two-dimensional sensor element array cannot be managed in a satisfactory manner by microprocessors normally used nowadays in the motor vehicle.

An apparatus of the above-mentioned type is known from U.S. Pat. No. 4,630,109, in which the sensor element arrangement includes one or two sensor element lines. For the case of only one sensor element line, the associated scanned strip of the roadway lies symmetrically in relation to the vehicle longitudinal center as a result of central positioning of a CCD camera. As an alternative, the use of two cameras arranged at the side is proposed, each of the cameras scanning a strip of the roadway. In the latter case, the two scanned lateral strips of roadway are located in the direction of the vehicle longitudinal axis at the same height in front of the vehicle and in each case extend approximately from the vehicle longitudinal center as far as beyond the relevant vehicle lateral region.

The European Patent document EP 0 640 903 A1 discloses an apparatus for determining the distance of a vehicle from at least one roadway side marking in which a portion of the roadway, typically extending to the front of the vehicle as far as 60 m, is optically scanned. An evaluation unit which is connected downstream evaluates the video image with respect to roadway markings which are present, and is equipped for the purpose of applying suitable forces to the steering mechanism of the vehicle. These forces are intended to facilitate the driver's staying in the roadway lane. In addition, a warning apparatus is provided which, in the event of the threatened crossing of a roadway marking, in a first stage emits an optical and haptic warning in the form of a steering wheel vibration and, in a second stage, emits an acoustic warning message to the driver.

The invention is based on solving the technical problems to provide an apparatus of the above-mentioned type which, on the one hand, makes possible reliable determination of the distance of the vehicle from roadway side markings and, on the other hand, requires only a comparatively low data processing outlay. This in particular would also readily allow digital processing of the sensor data in real time in a microprocessor in the vehicle. The apparatus would also be capable, if necessary, of producing an effective warning signal against a threatened crossing of a roadway marking.

These problems are solved by apparatus for determining the distance of a vehicle from a roadway side marking having an arrangement, fitted to the vehicle, of light-sensitive sensor elements for optically scanning a portion of the roadway located in front of the vehicle. The sensor element arrangement includes at least two sensor element lines, each of which scans a strip of the roadway which runs in front of the vehicle and is not parallel to the vehicle longitudinal axis, and extends laterally as far as the roadway side marking. An evaluation unit, which is connected downstream of the sensor element arrangement, reads each sensor element line sequentially and further processes the received signals for determining the lateral distance of the vehicle from the roadway marking. The sensor element arrangement contains two sensor element lines which scan two strips of the roadway which are spaced apart from each other in the direction of the vehicle longitudinal axis. A warning signal-producing apparatus is provided having loudspeakers which are fitted to the side in the vehicle interior, via which in the case of the threatened crossing of a roadway marking, detected by the evaluation unit, an artificially produced rumble strip noise is emitted in a side-specific manner on that side of the vehicle which threatens to cross the roadway marking.

Characteristically, in this case the sensor element arrangement comprises only one or a few sensor element lines, and not a normal two-dimensional sensor element array. This considerably reduces the quantity of data to be processed in real time by the evaluation unit connected downstream, so that this sensor data processing can be carried out digitally by a conventional microprocessor system which can be fitted in the vehicle without difficulty. Of course, analogue processing of the sensor data is further also contemplated as an alternative. The placing of the sensor element lines in such a way that they each scan a strip of roadway which is not parallel to the vehicle longitudinal axis, runs in front of the vehicle and extends laterally as far as the roadway markings, ensures that the roadway markings are reliably detected optically and can be recognized by the evaluation unit. This is done so that the latter can determine the lateral distances of the vehicle from the roadway markings.

Additionally, as a result of the use of a second sensor element line which scans a second strip of the roadway which is located at a predetermined distance parallel and in front of the first strip of the roadway scanned by the first sensor element line, the apparatus specifically permits verification of the measurement results of the one sensor element line by the respective other one, as well as automatic calibration of the entire system in respect of measurement of the angular error between the vehicle longitudinal axis and the optical axis.

A convenient sleep warning or lane guard function is realized specifically by the apparatus according to the invention in that an acoustic warning in the form of a so-called rumble strip noise is emitted in a side-specific manner in each case on that side of the vehicle on which the vehicle threatens to leave the lane. The rumble strip noise acoustically suggests to the driver that he is driving over a roadway marking provided with rumble strips or a profile. Since the meaning of this noise is known to the driver, he will most often carry out a suitable, intuitive steering correction very rapidly in order to guide the vehicle once more in the direction of the center of the lane.

In an advantageous refinement of the invention, the apparatus contains a line camera which is fitted behind the windscreen of the vehicle in such a way that it scans a strip of the roadway which is at right angles to the vehicle longitudinal axis and is located approximately between 4 m and 10 m in front of the vehicle. In the case of using the apparatus as a sleep warning system or as a "lane guard", this distance between the scanned strips of the roadway and the vehicle is sufficient in order to be able to warn a driver, who may have fallen asleep or been distracted, in good time.

An apparatus according to the present invention makes possible the additional determination of the yaw angle error and/or of the roadway width between the roadway markings, for which purpose the evaluation unit can be fed with the necessary input variables.

Before a threatened crossing of a roadway side marking, already relatively early before reaching the same, the apparatus according to the invention advantageously gives a warning through the use of the so-called TLC (time to line crossing) method, in which a continuous determination is made of the time duration after which the vehicle would reach a roadway side marking were it to travel further in accordance with the instantaneous driving condition. A warning is carried out in the case of falling below a predeterminable TLC minimum threshold which is, for example, on the order of magnitude of 0.5 s.

Other objects, advantages and novel features of the present invention will become apparent from the following detailed description of the invention when considered in conjunction with the accompanying drawings.

DETAILED DESCRIPTION OF THE DRAWINGS

Figure 1:
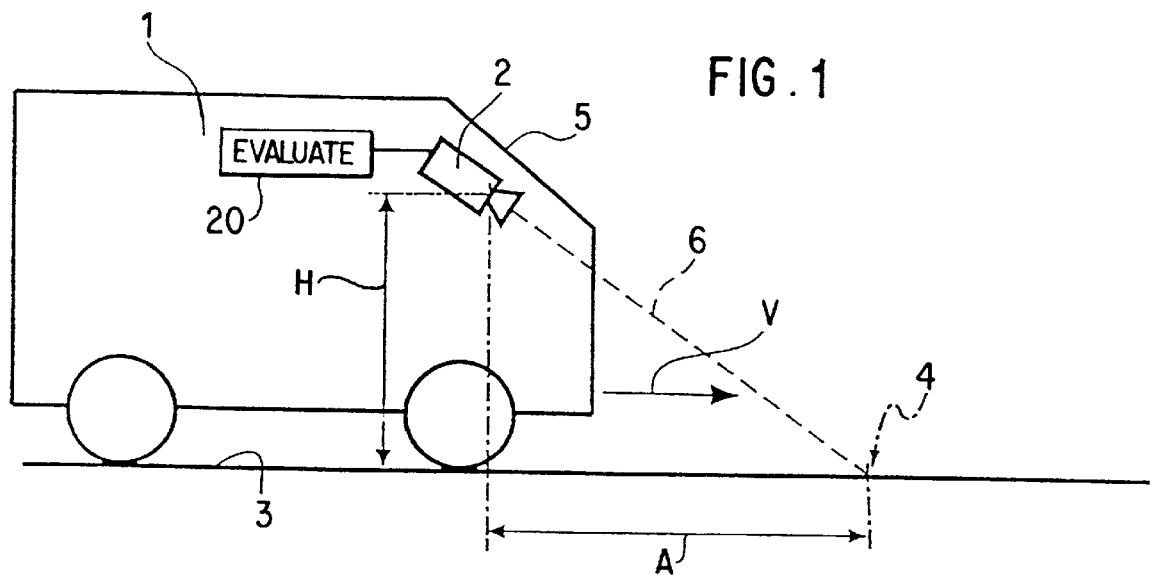
FIG. 1 is a schematic side view of a travelling commercial vehicle which is equipped with an apparatus for determining the distance of the vehicle from roadway side markings.

In the driving situation shown in the figures, a commercial vehicle 1, which is equipped with a line camera, is driving along one lane 3 of a motorway at a given speed v. The lane 3 is bounded on both sides by continuous lane markings 7, 8. Broken markings or a marking only on one side of the lane may also be provided as an alternative. The line camera 2 has a line of light-sensitive sensor elements, the number of which is typically between 128 and 1024. The line camera 2 is of normal construction and therefore does not need to be described in more detail here. It is fitted in the vehicle interior behind a windscreen 5 in the region of a rear-view mirror in the center of the vehicle. That is to say, it is located on the vehicle longitudinal axis L. In this case, the line camera 2 is inclined forward and downward in such a way that the light-sensitive sensor element line scans, with its associated scanning cone 6, a very narrow strip 4 of the roadway which, according to the application, runs at a distance of about 4 m to 8 m in front of the vehicle 1 at right angles to the vehicle longitudinal axis L.

Figure 2:
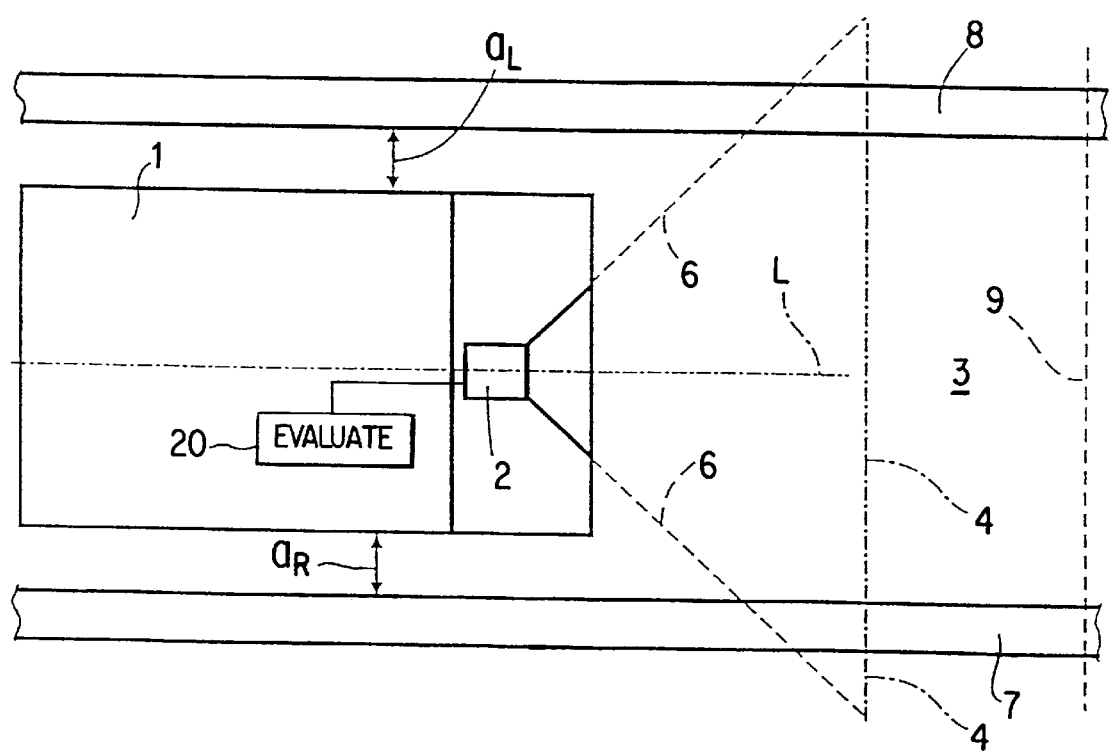
FIG. 2 is a schematic top view of the driving situation depicted in the side view in FIG. 1.

Connected downstream of the sensor element line of the line camera 2 is an evaluation unit 20 (which is not shown in more detail). The evaluation unit 20 reads the data sequentially out of the sensor element line and analyzes the data to determine the lateral distances ($a_L$, $a_R$) of the vehicle 1 from the left 8 and from the right 7 lane marking. It is a precondition for this that the scanning cone 6, which is projected onto the lane 3, of the sensor element line and hence the scanned, narrow strip 4 of the roadway, extends out sideways beyond the two lane-markings 7, 8, as shown in FIG. 2. For this purpose, the above-mentioned distance of the scanned strip 4 of the roadway from the vehicle 1 and hence the comparatively somewhat greater horizontal distance (A) of the scanned strip 4 of the roadway from the line camera 2 is selected to be sufficiently large. This can be ensured by a corresponding inclination of the line camera 2 at a given height (H) above the roadway 3 and a suitable focal length of the objective lens.

The apparatus therefore permits use as a sleep warning system, for which purpose the evaluation unit 20 drives an associated acoustic and/or haptic warning indicator element. A so-called rumble strip noise, such as is produced when driving over a continuous row of roadway marking rumble strips, can serve as a particularly neat acoustic warning signal. It is produced artificially and emitted in a side-specific manner via loudspeakers arranged to the side in the vehicle interior. That is to say, it is produced on that side of the vehicle on which the vehicle threatens to cross the roadway marking. Because of the understood meaning of this noise, the driver will intuitively and hence comparatively rapidly carry out a suitable steering correction which brings the vehicle back once more in the direction of the lane center.

To detect the threatened crossing of a roadway side marking, use is preferably made of the so-called TLC method, in which the evaluation unit derives, using the determined lateral distances ($a_L$, $a_R$) of the vehicle from the roadway side markings, from the determined yaw angle error and the detected vehicle speed, that time duration after which the vehicle would reach the roadway side marking if the present driving condition were to be maintained. The warning is always carried out if the time duration thus determined falls below a predetermined TLC minimum threshold of, typically, about 0.5 s.

Likewise, the evaluation unit, which further processes the brightness-proportional signal coming from the sensor element line of the scanned strip 4 of the roadway, has an essentially conventional construction, as it is used in a known way for the evaluation of the signals from an image sensor element arrangement. In this arrangement, the image positions of the right-hand roadway marking 7 and of the left-hand roadway marking 8 within the image supplied by the sensor element line are determined by means of a differentiating operator and a logic unit which operates in a nonlinear manner. Compared with the conventional systems using a two-dimensional sensor element array, in the present case the quantity of data which accumulates is considerably reduced because of the use of only one single sensor element line. This makes it possible to manage the further processing of the data in the evaluation unit, as well as the differentiating operator function and the nonlinear logic function for data pre-processing by means of a conventional microprocessor system.

On the one hand, the latter keeps the requirement for space and the computing complexity for this application in a motor vehicle tolerably low and, on the other hand, allows digital processing of the sensor signal information as an alternative to analog processing. As a result of the reduced quantity of data, the conventional microprocessor is able to process the data in real time, which is a precondition for the use of the apparatus as a sleep warning system. Alternatively, the differentiating operator and the nonlinear logic unit can be realized by a suitable discrete electrical circuit, as is described in the European Patent document EP 0 586 857 A1 mentioned above, or by a simple analog or discrete differentiator circuit with a downstream nonlinearity. The circuit is fed with the analogue signal from the sequentially read sensor element line. The exact design in terms of circuitry can readily be undertaken by those skilled in the art.

The internal camera parameters, the vehicle width, the height (H) of the line camera 2 above the roadway 3, the horizontal distance (A) between the sensor element line and the scanned strip 4 of the roadway, as well as the vehicle speed (v) can be fed as further input variables to the evaluation unit. Using these additional input variables, the evaluation unit is additionally able to detect, apart from the lateral distances ($a_L$, $a_R$) of the vehicle from the two roadway markings 7, 8, the yaw angle error and the width of the lane 3 between the roadway side markings 7, 8. This is done from the image positions, detected by the data pre-processing of the roadway side markings 7, 8 within the image supplied by the sensor element line through a downstream Kalman filter. This information can simultaneously be used for carrying out the above-specified TLC determination. With the aid of the Kalman filter, the image position of the roadway markings 7, 8 in the signal from the sensor element line can be predicted for the respective next measurement step. In this case, the successive measurements are advantageously carried out at a cycle of about 40 ms. A comparison of the predicted marking image position with the subsequently measured marking image position yields a system behavior which is not susceptible to interference.

In addition, the optional use of a second sensor element line can be advantageous. The line scans a second narrow strip 9 of the roadway, as shown with a dashed line in FIG. 2, which runs at a predetermined distance in front of the strip 4 of the roadway scanned by the first sensor element line, likewise at right angles to the vehicle longitudinal axis (L). This makes possible both verification of the measurements from the first-scanned strip of the roadway and automatic system calibration by measuring the angular error between the vehicle longitudinal axis (L) and the optical axis of the line camera arrangement.

The above description of a preferred exemplary embodiment shows that the apparatus according to the invention realizes a system for determining the distance of a vehicle from one or more roadway side markings which requires comparatively low technical outlay and nonetheless makes possible a sufficiently reliable lane detection in real time, so that the apparatus may be used as a sleep warning system. To be emphasized in this case are the low data processing outlay as a result of the use of only one or a few light-sensitive sensor element lines, the arrangement of the sensor element lines approximately at the height of the longitudinal central plane of the vehicle, so that one single objective lens is sufficient for the optical system, as well as the capability of being able to process the data, even by digital means, in real time by means of a conventional microprocessor.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for determining distance of a vehicle from at least one roadway side marking, comprising:

at least first and second light-sensitive sensor elements arranged on the vehicle for optically scanning respective first and second strips of the roadway, which strips are not parallel to a longitudinal axis of said vehicle and extend laterally with respect to the roadway at least as far as the at least one roadway side marking; and an evaluation unit operatively coupled to receive output signals from the first and second sensor elements, said evaluation unit reading said output signals of each of said first and second sensor elements sequentially and processing said output signals for determining a lateral distance of the vehicle from the at least one roadway side marking;

wherein said first and second strips of the roadway are spaced apart from each other in a direction of said longitudinal axis of said vehicle.

2. Apparatus according to claim 1, further comprising:

a warning signal-producing apparatus having loudspeakers fitted to an interior side of the vehicle via which, in an event of a threatened crossing of the roadway marking by the vehicle which is detected by the evaluation unit, emit an artificially produced rumble strip noise from an interior side of the vehicle on a side on which the vehicle threatens to cross the roadway marking.

3. The apparatus according to claim 2, wherein the sensor elements are part of a line camera fitted behind a windscreen of the vehicle and inclined forward and downward such that each sensor element line scans an associated strip of the roadway extending at right angles to the vehicle longitudinal axis and located between approximately 4 m and 10 m in front of the vehicle.

4. The apparatus according to claim 3, wherein the evaluation unit determines a time duration until the vehicle would reach a roadway side marking from determined lateral distances of the vehicle from the roadway side markings, and from a determined yaw angle error and a determined vehicle speed, said evaluation unit presupposing a maintenance of an instantaneous driving condition, and emitting a warning signal if the time duration falls below a predetermined minimum duration.

5. The apparatus according to claim 2, wherein: a height of the sensor elements above the roadway, a horizontal distance of the sensor elements from the strip of the roadway scanned by it, and a vehicle speed of the vehicle, are used as input variables for the evaluation unit; and the evaluation unit determines from said input signals at least one of a yaw angle error and a roadway width between the roadway side markings.

6. The apparatus according to claim 5, wherein the evaluation unit determines a time duration until the vehicle would reach a roadway side marking from determined lateral distances of the vehicle from the roadway side markings, and from a determined yaw angle error and a determined vehicle speed, said evaluation unit presupposing a maintenance of an instantaneous driving condition, and emitting a warning signal if the time duration falls below a predetermined minimum duration.

7. The apparatus according to claim 2, wherein the evaluation unit determines a time duration until the vehicle would reach a roadway side marking from determined lateral distances of the vehicle from the roadway side markings, and from a determined yaw angle error and a determined vehicle speed, said evaluation unit presupposing a maintenance of an instantaneous driving condition, and emitting a warning signal if the time duration falls below a predetermined minimum duration.

8. The apparatus according to claim 1, wherein said first and second sensor elements are part of a line camera fitted behind a windscreen of the vehicle and inclined forward and downward such that each sensor element line scans an associated strip of the roadway extending at right angles to the vehicle longitudinal axis and located between approximately 4 m and 10 m in front of the vehicle.

9. The apparatus according to claim 8, wherein the evaluation unit determines a time duration until the vehicle would reach a roadway side marking from determined lateral distances of the vehicle from the roadway side markings, and from a determined yaw angle error and a determined vehicle speed, said evaluation unit presupposing a maintenance of an instantaneous driving condition, and emitting a warning signal if the time duration falls below a predetermined minimum duration.

10. The apparatus according to claim 1, wherein:

a height of the sensor elements above the roadway, a horizontal distance of the sensor elements from the strips of the roadway scanned, and a vehicle speed of the vehicle, are used as input variables for the evaluation unit; and the evaluation unit determines from said input signals at least one of a yaw angle error and a roadway width between the roadway side markings.

11. The apparatus according to claim 10, wherein the evaluation unit determines a time duration until the vehicle would reach a roadway side marking from determined lateral distances of the vehicle from the roadway side markings, and from a determined yaw angle error and a determined vehicle speed, said evaluation unit presupposing a maintenance of an instantaneous driving condition, and emitting a warning signal if the time duration falls below a predetermined minimum duration.

12. The apparatus according to claim 1, wherein the evaluation unit determines a time duration until the vehicle would reach a roadway side marking from determined lateral distances of the vehicle from the roadway side markings, and from a detected yaw angle error and a determined vehicle speed, said evaluation unit presupposing a maintenance of an instantaneous driving condition, and emitting a warning signal if the time duration falls below a predetermined minimum duration.

\* \* \* \* \*